Patented May 6, 1952

2,595,405

UNITED STATES PATENT OFFICE 2,595,405

BENZHYDRYL ETHERS OF TROPINES AND THEIR PRODUCTION

Richard F. Phillips, Westfield, N. J., assignor to Merck & Co., Inc., Rahway, N. J., a corporation of New Jersey No Drawing. Application February 12, 1949, Serial No. 76,183

11 Claims. (Cl. 260—294.7)

This invention relates to the preparation of new chemical compounds and, more particularly, to the preparation of benzohydryl ethers of tropine, substituted hydroxy-piperidines and other similar compounds and their salts. These ethers are useful as therapeutic agents; certain of these compounds are powerful antispasmodics; they are especially effective as histamine antagonists and also exhibit exceptionally high atropine activity.

It has been proposed to prepare an ether of tropine by reacting methyliodide with the sodium alcoholate of tropine. (German Patent 106,492, Friedlander 5 792 (1901), Chem. Zentr. 1900 I. 1082.) However, the resulting methyl ester is reported as having a melting point of 300° C. Since tropine melts at about 60° C. and methyl ethers usually melt at a temperature lower than that of the parent compound, the high melting point reported by the German patent indicates the formation of a large proportion of some other compound and that no more than an extremely low yield of the desired ether was obtained. Furthermore, von Braun et al. (Berichte 63, 2847 (1930)) disclose that the methyl ether of tropine could not be obtained by a method which readily formed methyl ethers of many aminoalcohols.

I have now found that physiologically active ethers can be prepared by reacting diphenyldiazomethane with tropine, pseudotropine, substituted hydroxypiperidines and other aminoalcohols in which the amino group is tertiary. The reaction is preferably carried out by heating approximately equimolecular proportions of the aminoalcohol and diphenyldiazomethane at a temperature approaching the decomposition point of diphenyldiazomethane. It is desirable to carry out the process in the presence of an inert organic solvent in order to avoid explosive conditions which may occur if diphenyldiazomethane and tropine, for example, are heated directly on a steam bath. It is therefore desirable to add a small amount of an inert solvent to the reaction mixture. Particularly suitable solvents are those boiling at approximately 80° C. such as benzene, ethylene dichloride, diisopropyl ether, hydrocarbon fractions, and the like. While an ordinary steam bath may be used as a heating means for this process, it is preferred to carry out the reaction on a water bath at 85-95° C.

In carrying out the invention herein disclosed, in a preferred manner, diphenyldiazomethane is first prepared, for example, by oxidizing benzophenone hydrazone with yellow mercuric oxide in petroleum ether.

The resulting diphenyldiazomethane is then reacted with tropine in the presence of a suitable solvent such as benzene, at a temperature of about 85 to 90° C., under reflux.

The heating is continued for about 24 hours, and the resulting mixture is then dissolved by adding a water-immiscible organic solvent such as benzene, toluene or ether and water containing sulfuric, hydrochloric or similar acid, in an amount sufficient to combine with all the basic material present. The resulting two immiscible layers are separated.

The aqueous layer containing the tropine benzohydryl ether salt of the acid used is washed with an organic solvent such as benzene or ether and made alkaline with a base such as sodium hydroxide or the like in an amount sufficient to liberate all of the tropine benzohydryl ether.

The tropine benzohydryl ether which separates as an immiscible oil after alkalinization of the aqueous solution, may be readily purified by formation of the rather insoluble hydrobromide salt. This is conveniently done by dissolving the liberated oil in ether, separating the ether layer from the aqueous layer, and treating the ether extract with a slight excess of dilute aqueous hydrobromic acid. Tropine benzohydryl ether hydrobromide separates as an insoluble oil which soon crystallizes. The crystalline compound may be further purified by recrystallization or digestion with hot alcohol.

The free tropine benzohydryl ether, may be prepared by warming a water suspension of tropine benzohydryl ether hydrobromide in the presence of a base such as sodium hydroxide and isolating the insoluble free ether, preferably by extraction with a water immiscible organic solvent.

The hydrohalide salts of tropine benzohydryl ether can be conveniently converted to other physiologically active compounds such as the highly water-soluble tropine benzohydryl ether methane sulfonate and the methiodide or other alkyl and aralkyl quaternary salts may be obtained directly from tropine benzohydryl ether base by treatment with dimethyl sulphate, an alkylating or aralkylating agent such as methyliodide or benzylchloride.

The reaction of tropine with diphenyldiazomethane may be represented by the following equation:

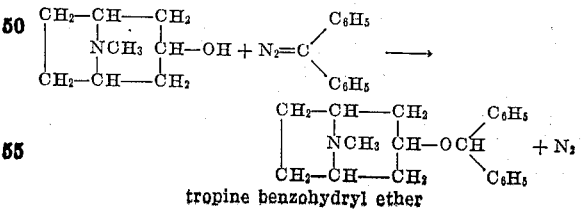

tropine benzohydryl ether

The reaction, capable of producing very high yields of tropine benzohydryl ethers is generally applicable to aminoalcohols in which the amino group is tertiary, for example, β-dimethylaminoethanol, N-methyl-4-hydroxypiperidine, pentaalkyl-4-hydroxypiperidine, and the like.

The tropine benzohydryl ether, its salts and quaternary derivatives possess highly potent atropine-like activity, as well as antihistamine activity. This is surprising since only the derivatives of hydroxy acids such as atropine and homatropine were known to possess a high degree of anticholinergic activity.

In view of similar chemical structure other diazo compounds would be expected to react with tropine in a manner similar to that of diphenyldiazomethane. However, all attempts to cause tropine to undergo reaction with phenyldiazomethane, p,p′-dimethoxydiphenyldiazomethane and 9-diazofluorene to obtain the corresponding tropine ethers resulted in failure.

The following examples illustrate methods of carrying out the present invention, but it is to be understood that these examples are given by way of illustration and not of limitation.

*Example 1*

Diphenyldiazomethane was prepared by shaking 7.9 g. of benzophenone hydrazone and 8.8 g. of yellow mercuric oxide in petroleum ether, filtering and evaporating off the petroleum ether from the filtrate under reduced pressure. To the residual diphenyldiazomethane 2.83 g. of tropine and 4.5 ml. of benzene were added. The mixture was warmed in a pan of hot water at about 85° C. under reflux for twenty-four hours after which time the original purple color had been largely discharged. The reaction mixture was dissolved by adding benzene and water containing hydrochloric acid in excess of the quantity theoretically required to form a salt. A rather large amount of water was required since the tropine benzohydryl ether hydrochloride was not very soluble and tended to separate as a third phase. The aqueous layer was separated, washed with benzene and with ether and made alkaline with an excess of sodium hydroxide. The resulting insoluble oil was extracted with benzene. The benzene extracts were dried over potassium carbonate and evaporated under reduced pressure, leaving a residue of 4.1 g. The residue (tropine benzohydryl ether) was dissolved in ether and treated with hydrogen bromide gas until an acidic reaction was obtained. The precipitate soon became crystalline and was collected on a filter and dried. The tropine benzohydryl ether hydrobromide weighed 4.1 g. Recrystallization from absolute ethanol gave 3.3 g. of first crop melting at 247–248° C. (dec.).

Anal.: Calcd. for $C_{21}H_{26}ONBr$: C, 64.94; H, 6.75; N, 3.61. Found: C, 64.94; H, 6.88; N, 3.81.

*Example 2*

The experiment was carried out as described in Example 1 using diphenyldiazomethane prepared from 18.7 g. of benzophenone hydrazone and 21.4 g. of yellow mercuric oxide, 12.5 g. of tropine and 6 ml. of benzene. The isolation of the hydrobromide was simplified as follows: The reaction mixture was dissolved by adding toluene and dilute sulfuric acid in excess of the quantity theoretically required to form a salt. The aqueous layer containing tropine benzohydryl ether sulfate was separated, washed with toluene and with ether and made alkaline with an excess of sodium hydroxide. The insoluble oily base was extracted by ether. The ether extract was washed with water, dried with potassium carbonate and filtered. The addition of slightly more than the calculated amount of hydrobromic acid diluted with water (about 100 ml. is convenient) precipitated the hydrobromide, which is almost insoluble in cold water, as an oil which soon became crystalline. The crystals were collected on a filter, washed with water and dried in the air. This product weighed 14.3 g. and melted at 240–242° C. (dec.). It was purified by digestion with about 100 ml. of boiling absolute alcohol, in which it did not all dissolve, cooling, collecting the crystals on a filter, washing with alcohol and drying. The purified tropine benzohydryl ether hydrobromide weighed 13.0 g., M. P. 247–248° C. (dec.).

*Example 3*

One gram of tropine benzohydryl ether hydrobromide was suspended in water containing 0.2 g. of sodium hydroxide, warmed and shaken until the solid had dissolved. The insoluble oily base was extracted with benzene. The benzene extracts were dried over potassium carbonate and evaporated under reduced pressure. Tropine benzohydryl ether base remained as an oil weighing 0.86 g.

The base was dissolved in 10 ml. of acetone and treated with 1 ml. of methyl iodide. A crystalline precipitate separated at once. It was collected on a filter, washed with acetone and dried; the material weighed 1.04 g. The tropine benzohydryl ether methiodide melted at 243–245° C. (dec.); it was insoluble in cold water.

The methiodide was suspended in water, warmed and stirred with an excess of freshly precipitated silver chloride. After filtering, the filtrate was evaporated under reduced pressure, leaving a crystalline residue. After washing with acetone and drying, the tropine benzohydryl ether methochloride weighed 0.72 g. and melted at 255–258° C. (dec.).

Anal.: Calcd. for $C_{22}H_{28}ONCl$: C, 73.83; H, 7.89; N, 3.91. Found: C, 73.81; H, 7.69; N, 3.99.

*Example 4*

A mixture of 1.00 g. of tropine benzohydryl ether hydrobromide and 0.523 g. of silver methanesulfonate were warmed in water and filtered. The filtrate appeared to contain colloidal silver bromide; however, it was evaporated to dryness under reduced pressure and the residue extracted with absolute ethanol, and the extract was filtered. The clear filtrate was evaporated to dryness under reduced pressure. The residue was dissolved in acetone. Addition of ether caused a crystalline precipitate to form. The tropine benzohydryl ether methanesulfonate was collected on a filter, washed with ether, and dried at 56° in vacuo. It melted at 138–140° C.

Anal.: Calcd. for $C_{22}H_{29}O_4NS$: C, 65.49; H, 7.24; N, 3.47. Found: C, 65.53; H, 7.44; N, 3.52.

*Example 5*

Twelve grains of tropine benzohydryl ether hydrobromide was converted to the free base by warming with dilute aqueous sodium hydroxide. The oily base was extracted with toluene. The toluene extract was washed with water and then extracted with about 100 ml. of water containing 28.1 ml. of 1.10 N methanesulfonic acid, (an equimolecular quantity). The toluene solution was extracted twice more with fresh portions of water. The combined water extracts were evaporated under reduced pressure. Residual water was removed by dissolving the residue in absolute ethanol and evaporating under reduced pressure several times. Residual alcohol was then removed by dissolving the residue in acetone and evaporating under reduced pressure several times. The resulting residue was recrystallized by dissolving in acetone and adding ether. The crystalline precipitate was collected on a filter, washed with ether and dried at 56° in vacuo. The tropine benzohydryl ether methanesulfonate weighed 10.2 g., M. P. 138–140° C.

*Example 6*

Diphenyldiazomethane (prepared from 7.9 g. of benzophenone hydrazone and 8.8 g. of yellow mercuric oxide), 2.79 g. of pseudotropine and 1.5 ml. of benzene were heated under reflux on a water bath at 85° C. for twenty-four hours at which time the original purple color had been largely discharged. The reaction mixture was treated with a mixture of benzene and dilute hydrochloric acid. The aqueous layer containing pseudotropine benzohydryl ether hydrochloride was separated, washed with benzene and with ether, made alkaline with sodium hydroxide and extracted with benzene. The benzene extract was washed with water, dried over potassium carbonate and evaporated under reduced pressure. The waxy residue weighed 4.94 g. It was purified by vacuum sublimation. The sublimed product, pseudotropine benzohydryl ether, melted at 63–65° C.

Anal.: Calcd. for $C_{21}H_{25}ON$: C, 82.05; H, 8.20; N, 4.56. Found: C, 82.13; H, 8.14; N, 4.44.

*Example 7*

The procedure of Example 6 was repeated with diphenyldiazomethane (prepared from 6.0 g. of benzophenone hydrazone and 6.7 g. of yellow mercuric oxide), 1.72 g. of N-methyl-4-hydroxypiperidine and 3.0 ml. of benzene; 2.86 g. of the basic oil was obtained after converting the crude N - methyl - 4 - hydroxypiperidine benzohydryl ether product to the hydrochloride and making alkaline and extracting. This was distilled in an inclined tube at 0.1 mm. pressure. The slight forerun which came over below 100° (heater temperature) was discarded. 2.27 g. of a light yellow oil distilled at 100–150° C. (heater temperature). The oil was dissolved in ether. Hydrogen bromide precipitated the crystalline hydrobromide. The crude material weighed 2.43 g. (after drying in vacuum desiccator). After two recrystallizations from isopropyl alcohol the melting point was 201–202° C.

Anal.: Calcd. for $C_{19}H_{24}ONBr$: C, 62.98; H, 6.68; N, 3.87. Found: C, 62.39; H, 6.45; N, 3.80.

*Example 8*

Diphenyldiazomethane (prepared from 4.9 g. of benzophenone hydrazone and 5.5 g. of yellow mercuric oxide), 2.2 g. of β-dimethylaminoethanol and 2.5 ml. of benzene were heated under reflux on a water bath at 85° C. for 24 hours. The cooled reaction mixture was treated with benzene and dilute hydrochloric acid. The aqueous layer was separated, washed with ether and with benzene, made alkaline with sodium hydroxide, and extracted with benzene. The benzene extract was dried with potassium carbonate and evaporated under reduced pressure. The residue was dissolved in ether and treated with hydrogen chloride. The precipitate was found to be a mixture of β-dimethylaminoethanol benzohydryl ether hydrochloride and N,N-dimethylbenzohydrylamine hydrochloride. The latter appears to have been formed from dimethylamine present as an impurity in the sample of β-dimethylaminoethanol. Separation was effected as follows: The hydrochloride precipitate was dissolved in water, the addition of an excess of pH 6.2 phosphate buffer precipitated N,N-dimethylbenzohydrylamine, M. P. 69–70° C. The filtrate was washed with benzene and ether, made alkaline with sodium hydroxide and extracted with benzene. The benzene extract was dried with potassium carbonate and evaporated under reduced pressure. The residue was dissolved in ether and treated with hydrogen chloride. The precipitated hydrochloride was recrystallized from acetone, M. P. 165–165.5° C.

*Example 9*

Diphenyldiazomethane (prepared from 7.8 g. of benzophenone hydrazone and 9.0 g. of yellow mercuric oxide), 3.4 g. of 1,2,2,6,6-pentamethyl-4-hydroxypiperidine and 3 ml. of benzene were heated at reflux on a hot water bath at 85° C. for twenty hours. The reaction mixture was treated with a mixture of benzene and dilute hydrochloric acid. The aqueous layer containing 1,2,2,6,6 - pentamethyl-4-hydroxypiperidine benzohydryl ether hydrochloride was separated, washed with benzene and with ether, made alkaline with sodium hydroxide and extracted with benzene. The benzene extract was washed with water, dried over potassium carbonate and evaporated under reduced pressure. The residual 1,2,2,6,6 - pentamethyl-4-hydroxypiperidine benzohydryl ether, weighing 5.6 g., was dissolved in ether. Hydrogen bromide precipitated a crude crystalline hydrobromide, weighing 5.8 g. and melting at 173–200°. After two recrystallizations from absolute ethanol and one recrystallization from water the melting point was 229–230° C. (dec.).

Anal.: Calcd. for $C_{23}H_{32}ONBr$: C, 66.02; H, 7.71; N, 3.35. Found: C, 65.78; H, 7.71; N, 3.76.

*Example 10*

Diphenyldiazomethane (prepared from 9.4 g. of benzophenone hydrazone and 10.7 g. of yellow mercuric oxide), 6.3 g. of tropine and 3 ml. of ethylene dichloride were heated under reflux on a water bath at 85° C. for twenty hours, at which time the original purple color had been largely discharged. The reaction mixture was worked up by the procedure described in Example 2. The crude product, after washing with water and drying, weighed 6.0 g. and melting at 242–244° C. (dec.). Digestion with hot absolute alcohol gave 5.5 g. of purified product melting at 248–249° C. (dec.).

Modifications may be made in carrying out the present invention without departing from the spirit and scope thereof and the invention is to be limited only by the appended claims.

I claim:

1. In a process for preparing a compound selected from the group which consists of benzohydryl ethers of tropine, benzohydryl ethers of pseudotropine, and their salts, the step that comprises reacting together in an inert organic solvent diphenyldiazomethane and an amino alcohol selected from the group consisting of tropine and pseudotropine.

2. The process for preparing tropine benzohydryl ether which comprises reacting tropine with diphenyldiazomethane in an inert solvent.

3. The process for preparing tropine benzohydryl ether which comprises reacting tropine with diphenyldiazomethane in benzene.

4. The process for preparing tropine benzohydryl ether which comprises reacting tropine with diphenyldiazomethane in an inert solvent medium, and recovering said tropine benzohydryl ether from the resulting reaction product.

5. A compound selected from the group which consists of benzohydryl ethers of tropine, benzohydryl ethers of pseudotropine, and their salts.

6. Tropine benzohydryl ether.
7. Tropine benzohydryl ether hydrohalide.
8. Tropine benzohydryl ether hydrobromide.
9. Tropine benzohydryl ether methanesulfonate.
10. Tropine benzohydryl ether methiodide.
11. Tropine benzohydryl ether methochloride.

RICHARD F. PHILLIPS.

REFERENCES CITED

The following references are of record in the file of this patent:

UNITED STATES PATENTS

| Number | Name | Date |
|---|---|---|
| 1,567,200 | Staudinger | Dec. 29, 1925 |
| 2,397,799 | Martin et al. | Apr. 2, 1946 |
| 2,427,878 | Rieveschl | Sept. 23, 1947 |

OTHER REFERENCES

Carronna: Chem. Abstr., vol. 33 (1939), p. 4251.
Arndt: Chem. Abstr., vol. 36 (1942), p. 5776.
Schonberg et al.: Chem. Abstr., vol. 41 (1947), p. 433.
Hardegger et al.: Helv. Chem. Act., vol. 31 (1948), pp. 439–445.